United States Patent
Buchheit (10) Patent No.: US 9,354,928 B1
(45) Date of Patent: May 31, 2016

(54) USER FACING LOAD BALANCING VIA VIRTUAL MACHINE SYNCHRONIZATION

(71) Applicant: Brian K. Buchheit, Davie, FL (US)

(72) Inventor: Brian K. Buchheit, Davie, FL (US)

(*) Notice: Subject to any disclaimer, the term of this patent is extended or adjusted under 35 U.S.C. 154(b) by 231 days.

(21) Appl. No.: 14/255,180

(22) Filed: Apr. 17, 2014

Related U.S. Application Data (60) Provisional application No. 61/815,303, filed on Apr. 24, 2013, provisional application No. 61/820,240, filed on May 7, 2013, provisional application No. 61/838,940, filed on Jun. 25, 2013, provisional application No. 61/844,545, filed on Jul. 10, 2013, provisional application No. 61/845,450, filed on Jul. 12, 2013, provisional application No. 61/980,218, filed on Apr. 16, 2014.

(51) Int. Cl.
| | |
|---|---|
| *G06F 17/30* | (2006.01) |
| *G06F 9/48* | (2006.01) |
| *G06F 9/455* | (2006.01) |
| *G06F 9/52* | (2006.01) |
| *H04L 29/06* | (2006.01) |
| *H04L 29/08* | (2006.01) |
| *H04L 12/46* | (2006.01) |

(52) U.S. Cl.
CPC .............. *G06F 9/4856* (2013.01); *G06F 9/455* (2013.01); *G06F 9/52* (2013.01); *H04L 12/4625* (2013.01); *H04L 29/06* (2013.01); *H04L 29/08072* (2013.01)

(58) Field of Classification Search
CPC ....................... H04L 29/08072; H04L 12/4625
USPC ........................... 709/223, 224, 236; 717/719
See application file for complete search history.

(56) References Cited

U.S. PATENT DOCUMENTS

| 8,135,703 | B2 * | 3/2012 | Barsness | G06F 17/30595 707/719 |
|---|---|---|---|---|
| 8,745,036 | B2 * | 6/2014 | Burger | G06F 17/30463 707/718 |
| 8,804,459 | B2 * | 8/2014 | Steimel | G01S 3/8083 367/100 |
| 8,861,353 | B2 * | 10/2014 | Duan | 370/230.1 |
| 2011/0010359 | A1 * | 1/2011 | Burger | G06F 17/30463 707/718 |
| 2012/0147760 | A1 * | 6/2012 | Duan | H04L 41/0816 370/252 |

* cited by examiner

*Primary Examiner* — Khanh Dinh
(74) *Attorney, Agent, or Firm* — Patents on Demand P.A.; Brian K. Buchheit; Scott M. Garrett (57) ABSTRACT

A native environment on a local device and a virtual environment on a server device linked to the native device over a network can concurrently execute. The concurrently executing can share state information to keep activities between both environments substantially time-synched. The native environment can be a user-machine interactive environment of a machine-to-user interactive interface. The native environment can perform stand-alone operation without appreciable end-user experience degradation. A process in the native environment requiring an excessive quantity of processing cycles can be detected. The native environment can not perform the processing using resources of the native environment. The virtual environment can perform the process and synchronize the result to the native environment, thereby permitting the native environment to continue to function as if the process was performed by the native environment.

20 Claims, 6 Drawing Sheets

USER FACING LOAD BALANCING VIA VIRTUAL MACHINE SYNCHRONIZATION

CROSS-REFERENCE TO RELATED APPLICATIONS

This utility application converts and claims the benefit of U.S. Provisional Patent Application No. 61/815,303 filed Apr. 24, 2013; U.S. Provisional Patent Application No. 61/820, 240 filed May 7, 2013; U.S. Provisional Patent Application No. 61/838,940 filed Jun. 25, 2013; U.S. Provisional Patent Application No. 61/844,545 filed Jul. 10, 2013; U.S. Provisional Patent Application No. 61/845,450 filed Jul. 10, 2013; and, U.S. Provisional Patent Application No. 61/980,218 filed Apr. 16, 2014. The entire contents of each of the above provisional applications (U.S. Application No. 61/815,303, 61/820,240, 61/838,940, 61/844,545, 61/845,450, and 61/980,218) are incorporated by reference herein.

BACKGROUND

The present invention relates to the field of load balancing and, more particularly, to user facing load balancing via virtual machine synchronization.

In today's mobile computing environment, users often interact with multiple computers to perform work and life activities. For example, many users interact with a work computer (e.g., company owned) and a personal computer (e.g., user owned) during a daily experience. Many times, synchronization between these multiple devices must be manually configured and/or manually performed before the devices are synchronized. This process can be time consuming and error prone, due to user error, network bandwidth limitations, and/or computing resource limitations.

In many instances, when a computer operating system crashes any unsaved data is potentially lost and unredeemable. Current solutions permit the user to restart the operating system and the operating system and/or the user can attempt to identify the problem. Frequently, these crashes are erratic and are difficult to circumvent, resulting in persistent crashes and lost data. This experience results in an unsatisfactory and frustrating episode for the user.

BRIEF SUMMARY

One aspect of the present invention can include a system, an apparatus, a computer program product and a method for concurrently executing a native environment on a local device and a virtual environment on a server device linked to the native device over a network. The concurrently executing can share state information to keep activities between the native environment and the virtual environment substantially time-synched. The native environment can be a user-machine interactive environment comprising a machine-to-user interactive interface. The native environment can be capable of standalone operation without appreciable end-user experience degradation. A process in the native environment requiring an estimated quantity of processing cycles to be consumed for completion that exceeds a previously established cycle threshold or requiring an estimated duration for completion that exceeds a previously established duration threshold can be detected. The native environment can not perform the processing using resources of the native environment responsive to detecting. The virtual environment can perform the process and can synchronize the result of the process to the native environment, thereby permitting the native environment to continue to function as if the process was performed by the native environment.

Another aspect of the present invention can include a system, a computer program product, an apparatus, and a method for concurrently executing two or more instances of a user session on two or more different computing devices. The devices can include a first device and a second device. The first device can execute a first instance of the two or more instances. The second device can execute a second instance of the two or more instances. The first device and second device can include hardware and software. The first device and second device can be remotely located from each other and can be communicatively linked to each other over a network. The second device can execute the second instance of the user session within a virtual machine running on the second device. The disclosure can maintain state across the instances of the user session in substantially real time. The state-affecting changes can be made in either the first instance or the second instances can be communicated to other ones of the instances to maintain a synchronized state for the user session. The first instance and second instance of the user session are capable of independent handling of the user session.

Another aspect of the present invention can include a method, a computer program product, an apparatus, and a system for load balancing and, more particularly, to user facing load balancing via virtual machine synchronization. A synchronization engine can be configured to persist a time-synchronized computing session associated with a native environment to a virtual environment. The native environment and virtual environment can execute concurrently. A data store can be able to persist at least one of a synchronization mapping, a state information, and a configuration setting.

DETAILED DESCRIPTION

The present disclosure is a solution for user facing load balancing via virtual machine synchronization. In the solution, a virtual machine can be synchronized with a computing device. The synchronization can replicate the computing device state. In one instance, a complex computation which can be prohibitive to execute on computing device can be executed on the virtual machine. In the instance, the computation can yield a result which can be conveyed to the computing device via a state synchronization. That is, the virtual machine state can be conveyed to computing device which can permit computing device to utilize the result without performing the complex computation.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
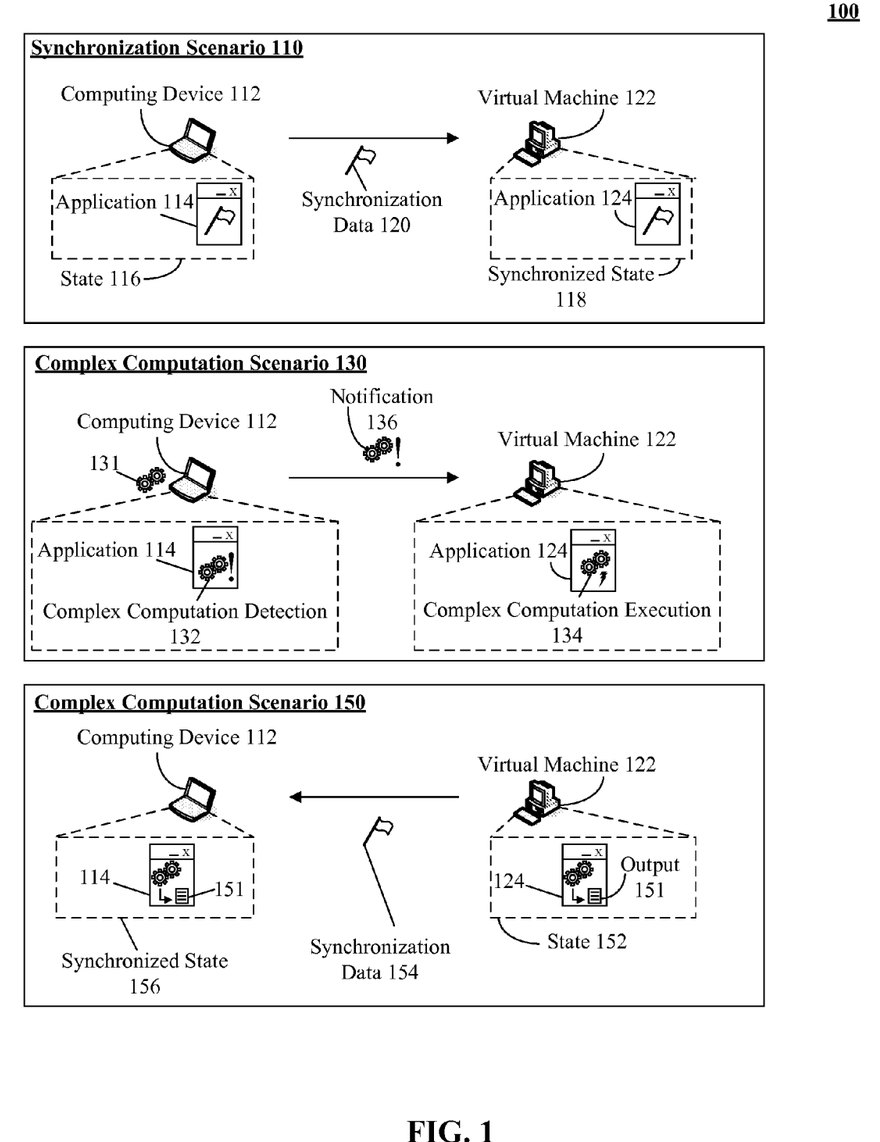
FIG. 1 is a schematic diagram illustrating a set of scenarios for user facing load balancing via virtual machine synchronization in accordance with an embodiment of the inventive arrangements disclosed herein.

FIG. 1 is a schematic diagram illustrating a set of scenarios 110, 130, 150 for user facing load balancing via virtual machine synchronization in accordance with an embodiment of the inventive arrangements disclosed herein. Scenarios 110, 130, 150 can be present in the context of method 200, system 300, and/or embodiments 400, 500, 600. In scenario 110, 130, 150, a virtual machine having a greater quantity of resources (e.g., memory, computing power) than a device 112 can be leveraged to perform complex computations 131 on behalf of device 112.

In scenario 110, a virtual machine can be synchronized with computing device 112 to permit the functionality of the disclosure. For example, a tablet computing device can be synchronized with a remote VMWARE virtual machine via one or more networks. In scenario 130, a complex computation 131 can be detected within an application 114 and the computation 131 can be performed on machine 122. For example, a complex graphic rendering can be detected within a video game application and the rendering can be performed on a server hosting virtual machine 122. In scenario 150, state 152 can be conveyed to device 112 via synchronization data 154 which can produce synchronized state 156 with output 151.

It should be appreciated that in scenario 110, 130, 150, device 112 and machine 122 can concurrently execute executable environments which can perform traditional and/or proprietary functionalities. The executable environments can include, but is not limited to, an operating system, an application (e.g., 114, 124), and the like.

In scenario 110, a computing device 112 and a virtual machine 122 can execute an application 114. For example, the application can be a desktop publishing application executing on a desktop computer. The application 114 can be associated with a state 116 which can be a finite state associated with a computing session. For example, state 116 can be a data set associated with a memory state of a device 112 operating system. The state 116 can include, but is not limited to, state information, state metadata, state settings, and the like. State information can include, but is not limited to, timing data (e.g., timestamp), memory data (e.g., pointers), application state information, thread information (e.g., thread state), process information, central processor unit state information (e.g., opcode), and the like. In one embodiment, state information can include information associated with power management states including, but not limited to, sleep, hiberanate, virtual machine suspension, and the like. The application 114 state 116 can be synchronized to a virtual machine 122 as application 124 synchronized state 118. Synchronization can utilize synchronization data 120 to permit application 124 to be in an identical state to application 114. In the instance, synchronization data 120 can be utilized to initialize and/or create virtual machine 122.

In scenario 130, the application 114 can include a complex computation 131 which can be detected by device 112 (e.g., operating system process). For example, a complex computation 131 can be a mathematical operation of a cryptography algorithm. In one instance, the detection 132 can be achieved through traditional and/or proprietary algorithm analysis techniques. For example, detection 132 can determine algorithm complexity using one or more run-time analysis techniques. The detection 132 can trigger a notification 136 to be conveyed to virtual machine 122. The notification 136 can initiate the complex computation 131 to be performed by application 124 as complex computation execution 134. In one instance, the computation 132 can be omitted by device 112. Execution 134 can be performed in real-time or near real-time.

In scenario 150, the execution of computation 131 can produce output 151. The state 152 can be conveyed to device 112 as synchronized state 156 resulting in output 151 being achieved without device 112 performing computation 131. That is, the computation 131 is not being performed in parallel on machine 122 and device 112, but rather only on machine 122. In this manner, the disclosure can sidestep traditional process/thread synchronization problems including, but not limited to, software lockout, race conditions, inconsistencies, and the like. In one instance, the computation 131 can be performed by one more virtual machines in parallel utilizing traditional and/or proprietary computing mechanisms.

It should be understood that the disclosure can utilize parallel computing conventions (e.g., task parallelization). It should be appreciated that computation 131 can include one or more executable branches of logic code which can be separately performed on device 112 and/or machine 122. In one instance, computation 131 can include a trivial execution and a complex execution. In the instance, the trivial execution can be performed on device 112 and the complex execution can be performed on machine 122. That is, device 112 can continue to operate without interruption during complex computation execution 134 processing.

Drawings presented herein are for illustrative purposes only and should not be construed to limit the invention in this regard. It should be appreciated that the disclosure does not delay expensive computations on device 112 but rather utilizes different existing computing resources (e.g., proximate/remote) to perform the computations and synchronize a finished execution state to obtain the computation output on the computing device 112. Device 112 and/or machine 122 can conform to traditional and/or proprietary architectures. In one embodiment, device 112 and/or machine 122 architecture can conform to x86 processor architecture.

It should be appreciated that the disclosure can utilize operating system-level virtualization, application virtualization and the like.

As used herein, synchronization can include synchronization of processes and/or synchronization of data. Process synchronization can include multiple process synchronization in which multiple processes handshake at a certain execution point to commit to a certain sequence of action. Data synchronization can include storing multiple copies of a dataset in coherence with one another or to maintain data integrity. Process synchronization primitives can be used to implement data synchronization. It should be appreciated that the scenario 110 utilizes data synchronization to achieve process synchronization objectives, but is not limited in this regard.

Data synchronization can include, but is not limited to, file synchronization, cluster file system synchronization, cache coherency, redundant array of inexpensive disk (RAID) synchronization (e.g., mirroring), database replication, journaling, and the like.

As used herein, in one embodiment, a virtual machine 122 (VM) can be a completely isolated guest operating system installation within a normal host operating system. Virtual machines can be implemented with either software emulation and/or hardware virtualization. That is, a virtual machine 122 (VM) can be a software implementation of a machine (e.g., computing device 112) which executes programs similarly to that of a physical machine.

Virtual machine 122 can include into two categories based on their use and degree of correspondence to a real machine. A system virtual machine can provide a complete system platform which supports the execution of a complete operating system (OS). In contrast, a process virtual machine is designed to run a single program, which means that the VM can support a single process. An essential characteristic of a virtual machine is that the software running inside is limited to the resources and abstractions provided by the virtual machine such that the software cannot break out (e.g., execute logic code) of its virtual environment.

VM 122 can include, but is not limited to multiple OS environments which can co-exist on the same computer, in strong isolation from each other. The virtual machine can provide an instruction set architecture (ISA) which is approximately different from that of the real machine. In the disclosure traditional functionality of VMs can be leveraged to enable the functionality to be implemented for device 112. The functionality can include, but is not limited to, providing application provisioning, maintenance testing, high availability, disaster recovery, and the like.

Process VMs (e.g., application virtual machine) can execute as a normal application inside a host OS and can support a single process. The VM can be created when the process is started and destroyed when exits. That is, process VMs provide a platform-independent programming environment that abstracts away details of the underlying hardware or operating system and allows a program to execute in the same way on any platform. In one instance, virtual machine 122 can be a process virtual machine associated with application (e.g., process) 114. In one instance, a process VM (e.g., machine 122) can conform to a JAVA VIRTUAL MACHINE (JVM), a PARROT VIRTUAL MACHINE, .NET Framework (e.g., Common Language Runtime), and the like.

In one embodiment, machine 122 can utilize full virtualization of hardware (e.g., device 112), and can be implemented using a Type 1 or Type 2 hypervisor. A Type 1 hypervisor can run directly on the hardware. A Type 2 hypervisor can run on another operating system (e.g., Linux). Each virtual machine can run any operating system supported by the underlying hardware.

Figure 2:
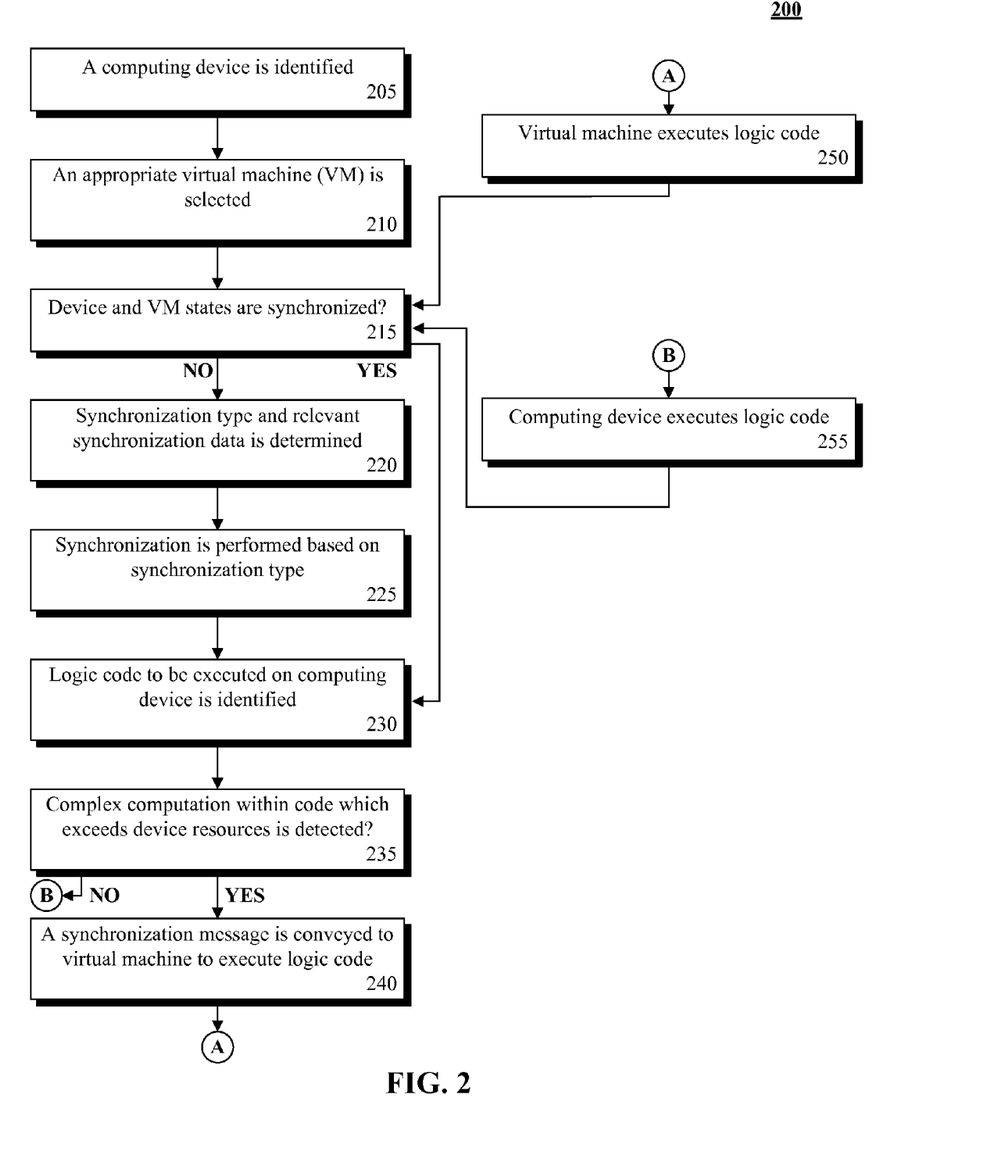
FIG. 2 is a flowchart illustrating a method for user facing load balancing via virtual machine synchronization in accordance with an embodiment of the inventive arrangements disclosed herein.

FIG. 2 is a flowchart illustrating a method 200 for user facing load balancing via virtual machine synchronization in accordance with an embodiment of the inventive arrangements disclosed herein. Method 200 can be present in the context of scenarios 110, 130, 150, system 300, and/or embodiments 400, 500, 600. Method 200 can be performed in parallel and/or in serial. Method 200 can be performed in real-time or near real-time. In method 200, a virtual machine can be utilized to assist a computing device in performing complex logic code. Logic code can include, static binaries, dynamic binaries, and the like. In one instance, logic code can be native executable logic code which can be associated with a native executable environment of a computing device.

In step 205, a computing device can be identified. Identification can be performed manually and/or automatically. For example, an automated registration can be performed by the disclosure when the device is powered on or started from a low power state (e.g., sleep). In step 210, an appropriate virtual machine can be selected. The virtual machine selection can be performed manually and/or automatically. In one instance, virtual machine can be selected automatically by architecture type, proximity (e.g., physical), bandwidth capacity (e.g., available high speed routes) and the like. In step 215, if the device and the VM states are synchronized the method can continue to step 220, else proceed to step 230. In step 220, synchronization type and relevant synchronization data can be determined. Synchronization type can include asynchronous communication, synchronous communication, and the like. In step 225, the synchronization can be performed based on the synchronization type. In step 230, logic code to be executed on the computing device can be identified. In step 235, if the complex computations within the logic code which exceed the devices resources is detected, the method can continue to step 240, else proceed to step 255. In step 240, a synchronization message can be conveyed to the virtual machine to execute the logic code. For example, state data including the logic code and the current state of the computing device can be conveyed to the virtual machine. In step 250, the virtual machine can execute the logic code. The method can return to step 215. In step 255, the computing device can execute the logic code.

Drawings presented herein are for illustrative purposes only and should not be construed to limit the invention in any regard. It should be appreciated that the method can perform step 215 after the execution of step 250 and/or step 255. That is, the method can enable real-time or near real-time device and machine synchronization.

Figure 3:
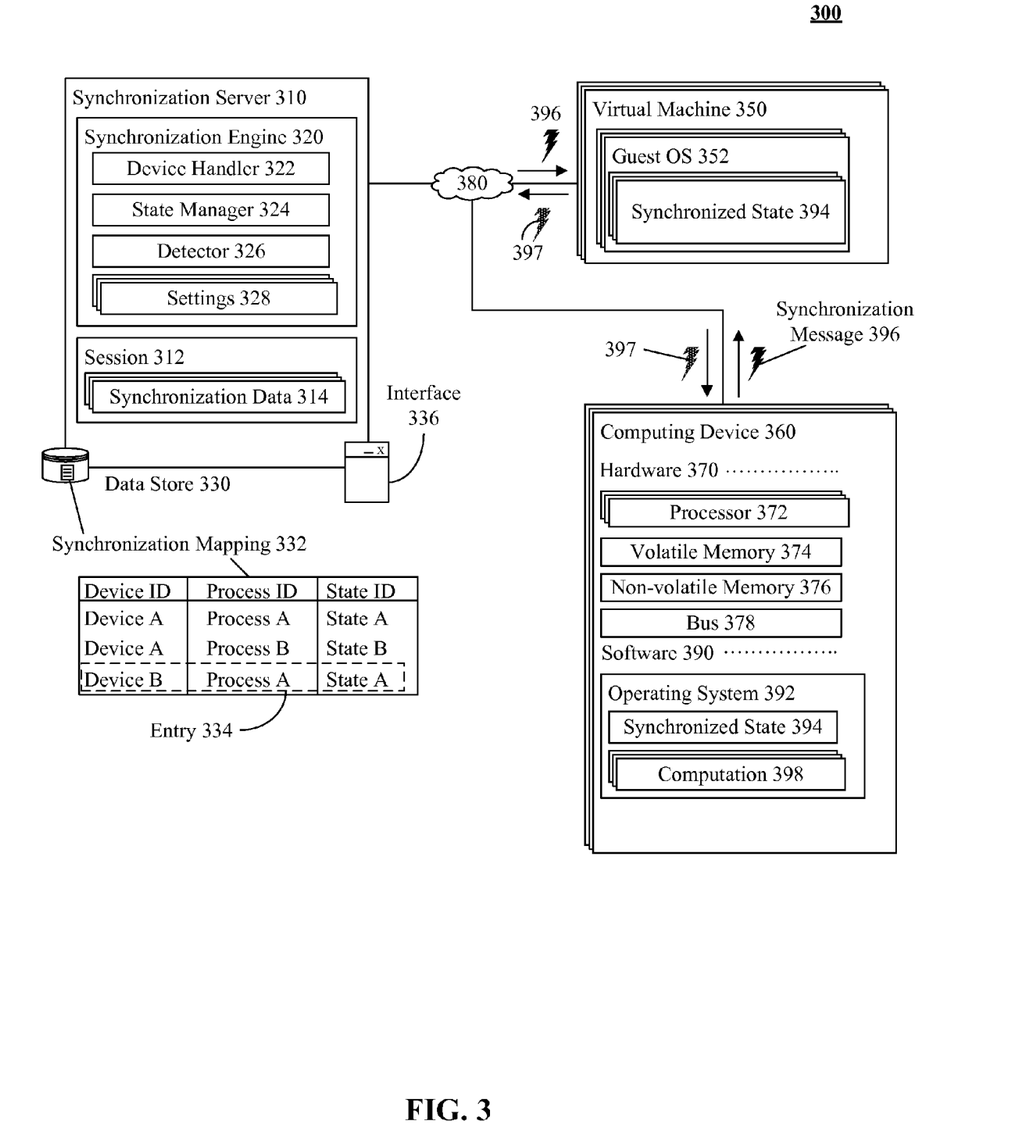
FIG. 3 is a schematic diagram illustrating a system for user facing load balancing via virtual machine synchronization in accordance with an embodiment of the inventive arrangements disclosed herein.

FIG. 3 is a schematic diagram illustrating a system 300 for user facing load balancing via virtual machine synchronization in accordance with an embodiment of the inventive arrangements disclosed herein. System 300 can be present in the context of scenarios 110, 130, 150, method 200, and/or embodiments 400, 500, 600. System 300 components can be communicatively linked via one or more networks 380. In system 300, a synchronization engine 320 can permit a virtual machine 350 to mirror the state of computing device 354 in real-time or near real-time. The virtual machine 350 can be leveraged by the computing device 360 to perform one or more computations 398.

Synchronization server 310 can be a hardware/software entity for executing synchronization engine 320. Server 310 can include, but is not limited to, synchronization engine 320, session 312, data store 330, interface 336, and the like. Server 310 functionality can include, but is not limited to, data anonymization, encryption, file sharing, desktop sharing capabilities (e.g., remote desktop), and the like. In one embodiment, server 310 can be a component of a Service Oriented Architecture. In one instance, server 310 can be a functionality of a virtual machine 350. In one embodiment, server 310 can include message handling capabilities. For example, server 310 can facilitate synchronization message 396, 397 communication and/or processing. In one embodiment, server 310 can coordinate virtual machine 350 operation. In the embodiment, one or more virtual machines 350 can be dynamically employed (e.g., dynamic pooling) by server 310 to perform computation 398.

Synchronization engine 320 can be a hardware/software component for synchronizing a computing device 360 with a virtual machine 350. Engine 320 can include, but is not limited to, device handler 322, state manager 324, synchronizer 326, settings 328, and the like. Engine 320 functionality can include, but is not limited to, session 312 initiation, session 312 management, session 312 termination, session 312 conflict resolution, and the like. In one instance, engine 320 can be a component of a networked computing environment, distributed computing environment, and the like. In one embodiment, engine 320 can be a functionality of a computing device 360 operating system 392. In one instance, engine 320 can communicate state changes (e.g., deltas) between machine 350 and device 360 to overcome bandwidth and/or resource limitations.

In one embodiment, engine 320 can be a computing cloud based element performing cloud computing functionality. In the embodiment, engine 320 can provide synchronization services to cloud capable devices (e.g., device 360).

Device handler 322 can be a hardware/software element for managing device 360 and/or machine 350. Handler 322 functionality can include, but is not limited to, device 360 registration, machine 350 registration, presence information management, resource allocation determination, and the like. In one instance, handler 322 can be utilized to determine processor architecture 372 type of device 360, operating system 392, memory 374 quantity, and the like. In the instance, handler 322 can utilize acquired device 360 metadata to establish an appropriate virtual machine 350. In one instance, handler 322 can be utilized to dynamically adjust machine 350 based on changes in device 360 configuration, computational resource requirements, and the like. For example, handler 322 can permit machine 350 to dynamically utilize multiple processors based on computation 398 complexity. In one embodiment, handler 322 can facilitate horizontal and/or vertical scaling based on computational complexity.

State manager 324 can be a hardware/software component for managing synchronized state 394. Manager 324 functionality can include, but is not limited to, state 394 persistence, state 324 monitoring, state 324 changes, and the like. For example, manager 324 can capture snapshots of an application state during runtime. In one embodiment, manager 324 can be a functionality of an operating system 392 and/or an application. Manager 324 can utilize synchronization mapping 332 to perform state synchronization. For example, manager 324 can track the state (e.g., State A) of a process (e.g., Process A) within a device (e.g., Device B). In one instance, manager 324 can coordinate synchronization messages 396, 397 in response to a state 394 change. In the instance, synchronization messages 396,397 can be conveyed between device 360 and machine 350. It should be appreciated that server 310 can be utilized to communicate messages 396, 397 (e.g., message proxy).

Detector 326 can be a hardware/software element for identifying and/or determining computation 398. Detector 326 functionality can include, but is not limited to, algorithm analysis, resource monitoring (e.g., processor 372 usage), complex instruction detection (e.g., floating point arithmetic), and the like. In one embodiment, detector 326 can utilize historic computational information to determine computation 398 complexity and/or runtime requirements. It should be appreciated that detector 326 can be utilized in the presence of multiple processors.

Settings 328 can be one or more options for configuring the behavior of system 300, engine 320, machine 350, and or device 360. Settings 328 can include, but is not limited to, engine 320 options, handler 322 settings, manager 324 options, detector 326 settings, session 312 options, and the like In one instance, settings 328 can be presented within interface 336, an interface associated with device 360, and the like. Settings 328 can be persisted within data store 330, device 360, machine 350, and the like.

Session 312 can be a semi-permanent interactive information interchange, between two or more communicating devices and/or a computer and a user. Session 312 can include, but is not limited to, stateful session, stateless sessions, and the like. Session 312 can include, but is not limited to, synchronization data 314, synchronization mapping 332, and the like. In one instance, session 312 can include a desktop sharing session. Synchronization data 314 can include, but is not limited to, thread identification data, process identification data, file synchronization data, cache coherency data, checkpointing data, and the like. In one embodiment, data 314 can include, but is not limited to, inputs, outputs, and the like.

Data store 330 can be a hardware/software component able to persist synchronization mapping 332, synchronization data 314, settings 328, and the like. Data store 340 can be a Storage Area Network (SAN), Network Attached Storage (NAS), and the like. Data store 340 can conform to a relational database management system (RDBMS), object oriented database management system (OODBMS), and the like. Data store 340 can be communicatively linked to server 310 in one or more traditional and/or proprietary mechanisms. In one instance, data store 340 can be a component of Structured Query Language (SQL) complaint database.

Synchronization mapping 332 can be one or more data sets for synchronizing operating system 392 with guest operating system 352. Mapping 332 can include, but is not limited to, a device identifier, process identifier, state identifier, a timestamp, and the like. In one instance, mapping 332 can be manually and/or automatically generated in real-time or near real-time. In one embodiment, mapping 332 can be dynamically updated based on state 394. Mapping 332 can be include multiple processes mapped to a device, multiple states mapped to a process, multiple states mapped to a device, and the like. In one embodiment, mapping 332 can permit engine 320 to persist multiple viable states for device 360. In the embodiment, engine 320 can permit state selection, state execution, and the like. For example, mapping 332 can permit a dual-boot (e.g., two operating systems) device to persist a state for each execution environment.

Interface 336 can be a user interactive component permitting interaction and/or presentation of mapping 332. Interface 336 can be present within the context of a Web browser application, virtual machine application, system setting interface, and the like. In one embodiment, interface 336 can be a screen of a VIRTUALPC configuration interface. Interface 336 capabilities can include a graphical user interface (GUI), voice user interface (VUI), mixed-mode interface, and the like. In one instance, interface 336 can be communicatively linked to computing device.

Virtual machine 350 can be a hardware/software entity for executing guest operating system (OS) 352. Machine 350 can include a physical device, a logical device, and the like. Machine 350 can include, but is not limited to, a virtual machine server, a virtual machine client, and the like. For example, machine 350 can be a VMWARE ESX or ESXi enterprise software hypervisor. In one instance, machine 350 can be a VMWARE WORKSTATION VM, a VIRTUAL PC VM, a VIRTUALBOX VM, a PARALLELS WORKSTATION VM, a VIRTUAL IRON VM, and the like. In one embodiment, machine 350 can include server functionality which can be utilized to perform distributed computing actions. In the embodiment, machine 350 can harness communicatively linked devices and/or virtual machines to perform computation 398.

Guest OS 352 can be a collection of software which can manage computer hardware resources and/or provides common services for computer programs. OS 352 can include, but is not limited to, real-time operating systems, non-real-time operating systems and the like. OS 352 can include, but is not limited to, MICROSOFT WINDOWS, APPLE MAC OS (e.g., OS X), UNIX, LINUX, QNX, GOOGLE CHROME OS, EYEOS, and the like. In one embodiment, OS 352 can include mobile operating systems in including, iOS, ANDRIOD, and the like. OS 352 can include, but is not limited to, a synchronized state 354, OS data, and the like. It should be appreciated that guest OS 352 do not have to be compliant with the hardware 370.

Computing device 360 can be a hardware/software entity for executing operating system 392. Device 360 can include, but is not limited to, a hardware 370, a software 390, and the like. Hardware 370 can include, but is not limited to, processor 372, volatile memory 374, non-volatile memory 376, bus 378, and the like. Hardware 370 can include input components such as, a keyboard, a mouse, a stylus, a touchscreen, a gesture capture device, a camera, and the like. Harare 370 can include, output components such as, a loudspeaker, a display, and the like. Software 390 can include, but is not limited to, operating system 392, firmware, and the like. Operating system 392 can include synchronized state 394, applications, and the like.

Synchronization message 396 can be a data set for synchronizing device 360 with machine 350. Message 396 can conform to traditional and/or proprietary messaging standards. Message 396 can include, but is not limited to, synchronous message passing, asynchronous message passing, and the like. Message 396 format can include an Extensible Markup Language (XML) message, Simple Object Access Protocol message, Common Object Request Broker Architecture (CORBA), and the like. Message 396 can conform to one or more Internet protocols including, but not limited to, Hypertext Transport Protocol (HTTP), Hypertext Transport Protocol Secure (HTTPS), and Simple Text Oriented Message Protocol (STOMP), and the like. In one embodiment, message 396 can be associated with a message queue. For example, message 396 can include a VFABRIC RABBITMQ architecture.

Computation 398 can be one or more executable logic code operating within an operating system 392. Computation 398 can include, but is not limited to, information processing, algorithm execution, and the like. Computation 398 can include data, metadata, and the like. In one instance, computation 398 can include, but is not limited to, a virtualization executable logic, an executable logic event, a transaction based event, a data loss event, a software licensing restriction, a data replication operation, and the like.

In one embodiment, the disclosure functionality can be embodied within an Application Programming Interface. In the embodiment, the API can conform to traditional and/or proprietary conventions. In one instance, the API can conform to industry conventions permitting existing operating systems to access the functionality of the disclosure. In one embodiment, the disclosure can be a functionality of a pre-execution environment (PXE). In the embodiment, the pre-execution environment can communicated via a network interface to obtain a synchronized state Drawings presented herein are for illustrative purposes only and should not be construed to limit the invention in any regard. It should be appreciated that the disclosure can multiple synchronized states for different run levels (e.g., multi-user, single user) associated with multi-user operating systems. It should be appreciated that virtual machine 350 can include multiple VMs each running their own operating system (e.g., guest operating system 352). It should be understood that synchronization within the disclosure can include maintaining memory coherence, cache coherency, and the like.

Figure 4:
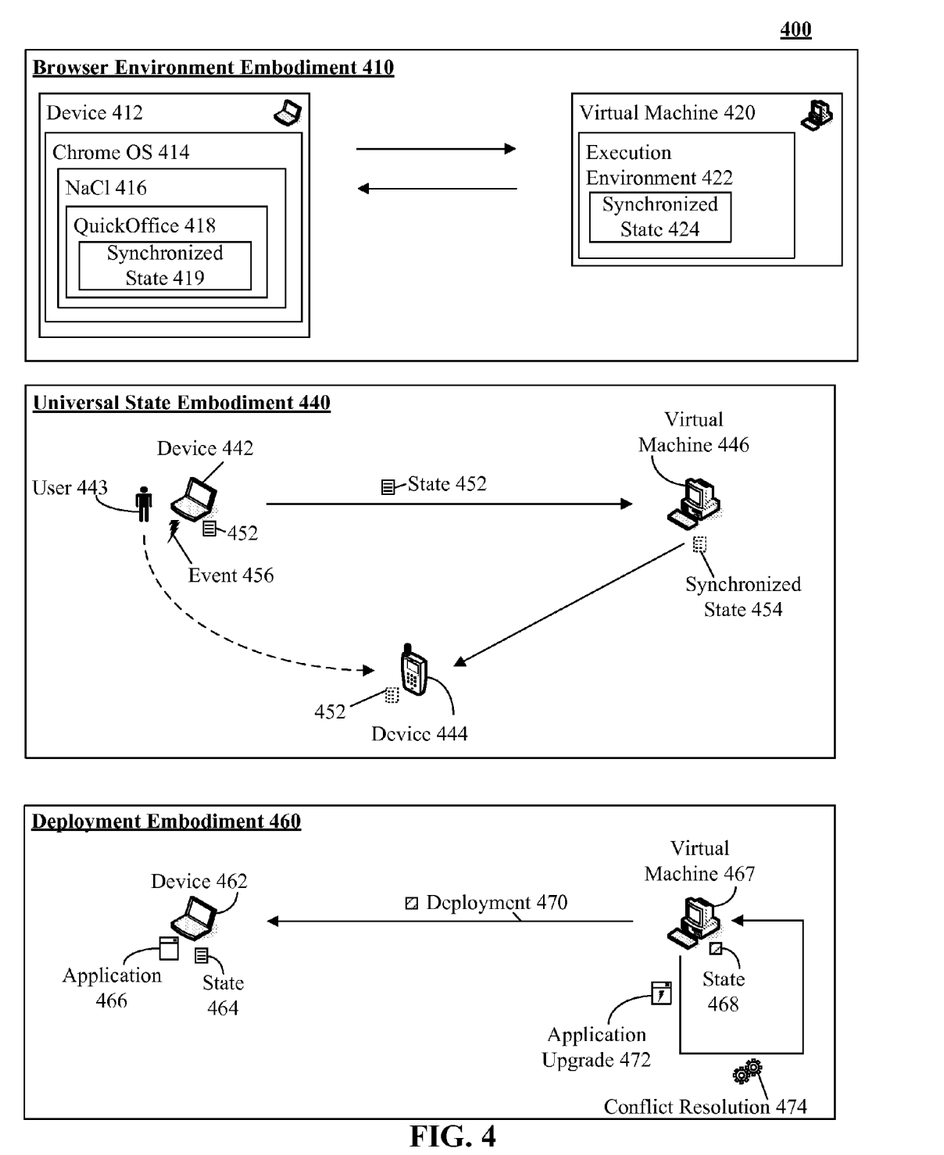
FIG. 4 is a schematic diagram illustrating a set of embodiments for user facing load balancing via virtual machine synchronization in accordance with an embodiment of the inventive arrangements disclosed herein.

FIG. 4 is a schematic diagram illustrating a set of embodiments 410, 440, 460 for user facing load balancing via virtual machine synchronization in accordance with an embodiment of the inventive arrangements disclosed herein. Embodiments 410, 440, 460 can be present in the context of scenarios 110, 130, 150, method 200, system 300, and/or embodiments 500, 600. In embodiment 410, an execution environment 422 can replicate (e.g., state 424) the synchronized state 419 of Chrome OS 414 and/or NACL 416. In embodiment 440, a synchronized state 454 can enable a device independent intermittent user interaction with device 442 and/or 454. In embodiment 460, a virtual machine 466 state 468 can be utilized to enable rapid software deployments with minimal effort and/or conflicts.

In browser environment embodiment 410, a device 412 can execute a Chrome operating system (OS) 412. The OS 412 can include a sandboxed execution environment such as a GOOGLE NATIVE CLIENT (NaCl). The NaCl 416 software can execute one or more applications. For instance, the environment 416 can execute a GOOGLE QUICK OFFICE 418 application. The application 418 can include a synchronized state 419 which can be linked to state 424 of environment 422 within virtual machine 420. That is, the virtual machine can be time and/or state synchronized with activities occurring within the NaCl 416 sandbox.

In one embodiment, the functionality of embodiment 410 can be encapsulated within a Web-browser plug-in. In another embodiment, the functionality of embodiment 410 can be present within a process of an operating system.

It should be understood that NaCl 416 is a sandboxing technology of an execution environment (e.g., Chrome OS) and can execute Web-based applications as native code, the NaCl 416 can include states similar to an execution environment. That is, the NaCl can be a sandboxed execution environment within an execution environment (e.g., Chrome OS 414). In one instance, NaCl 416 can execute within a GOOGLE CHROME browser. It should be appreciated that NaCl can include portable variants such as GOOGLE PEPPER. It should be appreciated that state 419 can include multiple application states, and/or NaCl system state. In one embodiment 410, the disclosure can be a functionality of an Application Programming Interface (API) (e.g., Pepper Plugin API).

In universal state embodiment 440, a user 443 can utilize a device 442 and can be interrupted by event 456. For example, device 442 can execute a functionality which can trigger a system failure (e.g., crash). That is, user 443 interaction can be interrupted temporarily and/or permanently. In the embodiment 440, device state 452 can be conveyed to virtual machine 446 prior to the event 456. Machine 446 can persist state 452 as a synchronized state 454. That is, state 454 can be a recent state of device 442 prior to event 456 occurrence. In one instance, detection of event 456 can trigger the synchronization of state 452. Synchronization of state 452 can be performed employing traditional and/or proprietary state persisting mechanisms.

In one configuration of the instance, the disclosure can automatically detect devices proximate to user 443 (e.g., device 444). In one embodiment, the disclosure can programmatically detect proximate devices based on historic device usage, device proximity, user preferences, and the like. In the configuration, the disclosure can convey synchronized state 454 to device 444 upon user interaction with device 444. User 443 can interact with device 444 with state 452. That is, user 443 can seamlessly interact with a previous state (e.g., state 452) of a device (e.g., device 442) on a different device (e.g., device 444). It should be appreciated that the functionality of the embodiment 440 can be performed without a persistent network connectivity.

In deployment embodiment 460, a device 462 can execute one or more applications 466. Applications 466 can be associated with a state 464. State 464 can include, application revisioning information, user preferences, and the like. In the embodiment, virtual machine 467 can utilize state 464 to perform an application upgrade 472. For example, application 466 can be an outdated revision of a Web browser which can be upgraded to a newer revision. In the embodiment, one or more conflict resolution 474 actions can be performed to determine a successful application upgrade 472. In one instance, one or more conflicts can be conveyed to a user to inform the user of potential changes to application 466. Upon completion of application upgrade 472, the state 468 can be created. That is, the state 468 can be a computer state with a successfully upgraded version of application 466.

In one embodiment, a deployment 470 action (e.g., performed by the virtual machine 467) can be executed which can convey state 468 to device 462. In the instance, the deployment action 470 can update device 462 with state 468 resulting in device 462 having an upgraded application.

It should be appreciated that the disclosure can be utilized to perform operating system upgrades, firmware upgrades, and the like. In one embodiment, the disclosure can enable rapid porting of device settings, software (e.g., drivers, applications), user preferences, and the like. For example, when a new computer is purchased, an existing state 468 of a previous computer can be deployed to the new computer. In one instance, computer resellers can leverage the disclosure capability to reduce software costs by deploying an existing installation of an operating system, application, and the like.

Figure 5:
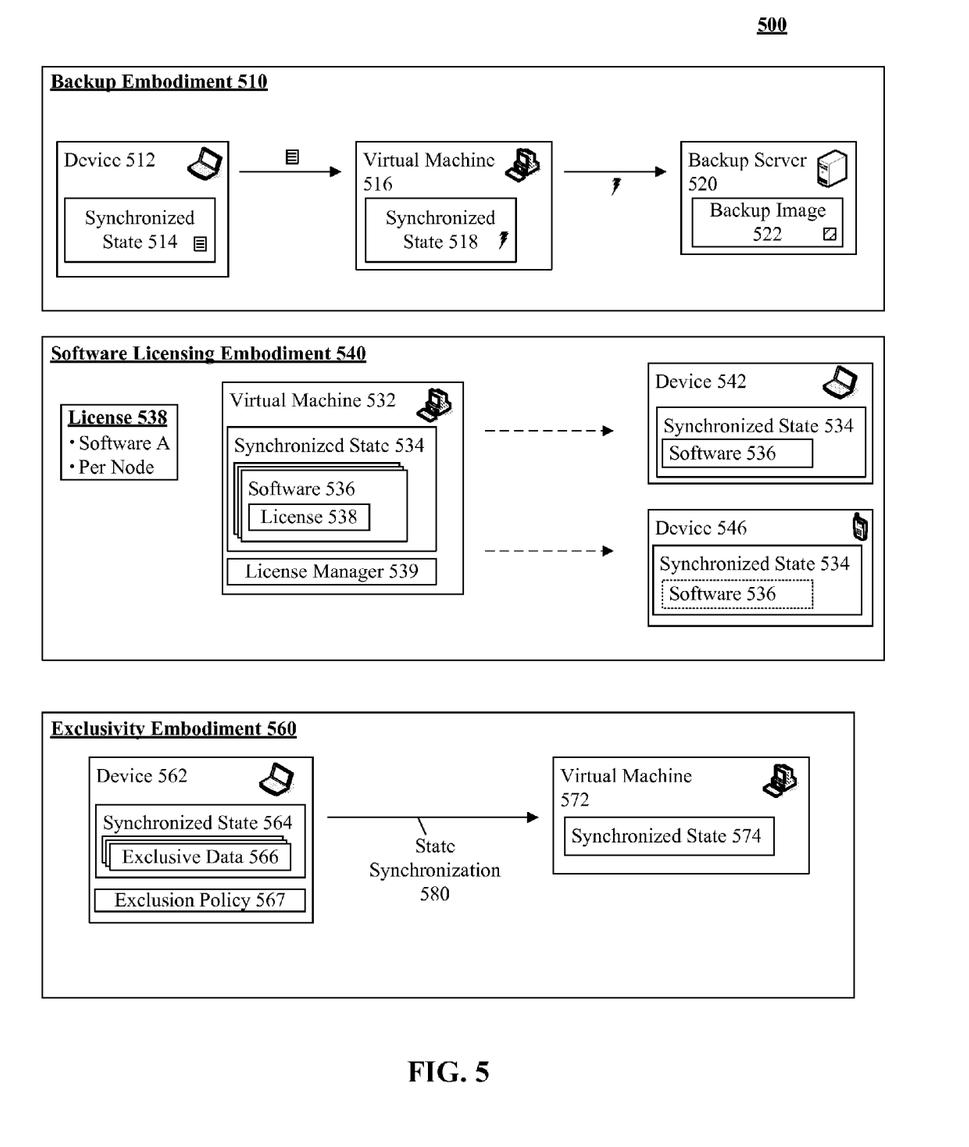
FIG. 5 is a schematic diagram illustrating a set of embodiments for user facing load balancing via virtual machine synchronization in accordance with an embodiment of the inventive arrangements disclosed herein.

FIG. 5 is a schematic diagram illustrating a set of embodiments 510, 540, 560 for user facing load balancing via virtual machine synchronization in accordance with an embodiment of the inventive arrangements disclosed herein. Embodiments 510, 540, 560 can be present in the context of scenarios 110, 130, 150, method 200, system 300, and/or embodiments 400, 600. In embodiment 510, a synchronized state 518 of a virtual machine 518 can be utilized to create a backup of device 512 state. In embodiment 540, a software 536 can be usable on a device 542, 546 based on license 538. In embodiment 560, an exclusion policy 567 can be utilized to securely omit exclusive data from a state synchronization 580.

In backup embodiment 510, a device 512 can be synchronized with a virtual machine (VM) 516 resulting in synchronized state 514 to be replicated on VM 516 as synchronized state 518. For example, device 512 can be a tablet device which can be state synchronized with a remote virtual machine 516 (e.g., cloud). In the embodiment 510, synchronization state 518 can be an identical replica of state 514. For example, the state 518 can be a real-time representation of state 514. State 518 can be utilized to backup device 512 on backup server 520. That is, a backup image 522 can be created from state 518 which can reduce network resource usage, device 512 resource usage, and the like. In one instance, multiple "savepoints" can be established for a single computing session. In the instance, the savepoints can be selected to permit reversion of a previous state.

In software licensing 540, a virtual machine 532 can include a license manager 539 which can enable software 536 to be dynamically shared between device 542, 546. Software 536 can be associated with a license 538 which can limit the software usage based on traditional and/or proprietary policies. For example, license 538 can be a per node software license permitting a Software A to be executable on only one device at a time. In one embodiment, the machine 532 can persist a synchronized state 534 which can be utilized to limit the usage of software 536. In the embodiment, manager 539 can employ a license 538 to permit device 542, 546 to share software 536 in accordance with the license 538. For example, software 536 can be installed upon device 542 but can be accessible on device 546 only when device 542 is not operational. That is, the disclosure can permit easy software sharing between multiple devices while complying with an existing licensing scheme. It should be appreciated that license 538 can include any traditional and/or proprietary licensing scheme. In one instance, when a license 538 is unavailable, manager 539 can utilize user preferences, software settings, administrative policies, and the like to permit software 536 usage. In one embodiment, licensing manager 539 can be associated with a synchronization engine 320.

In exclusivity embodiment 560, a synchronized state 564 within a device 562 can include exclusive data 566. For example, data 566 can include sensitive data such as financial data of a user (e.g., credit card information). Data 566 can be associated with an exclusion policy 567 which can be one or more rules for omitting data within state 564 during a state synchronization 580. Exclusion policy 567 can include, but is not limited to, a rule identifier, a rule, a data identifier, an expiration timestamp, a state identifier, and the like. In the embodiment 560, the state 564 can be synchronized to virtual machine 572 resulting in a synchronized state 574 which can lack exclusive data 566.

It should be appreciated that exclusion policy 567 can leverage existing security protocols, procedures, applications, and the like. In one embodiment, policy 567 can establish storage restrictions for state 564 with exclusive data 566 persisted as state 574. In the embodiment, virtual machine 572 and state 574 can be persisted as an encrypted file within a network. For example, virtual machine 572 can be a file stored within a hidden and/or encrypted TRUECRYPT volume protected by a password and/or a keyfile.

Drawings presented herein are for illustrative purposes only and should not be construed to limit the invention in any regard. In one instance, virtual machine 516 can be utilized to offload virus checking actions, network intensive operations, and the like from device 512. Since, state 518 is identical to state 514, operations performed by the machine 516 (e.g., downloading large files) and the result can be quickly synchronized to device 514.

Figure 6:
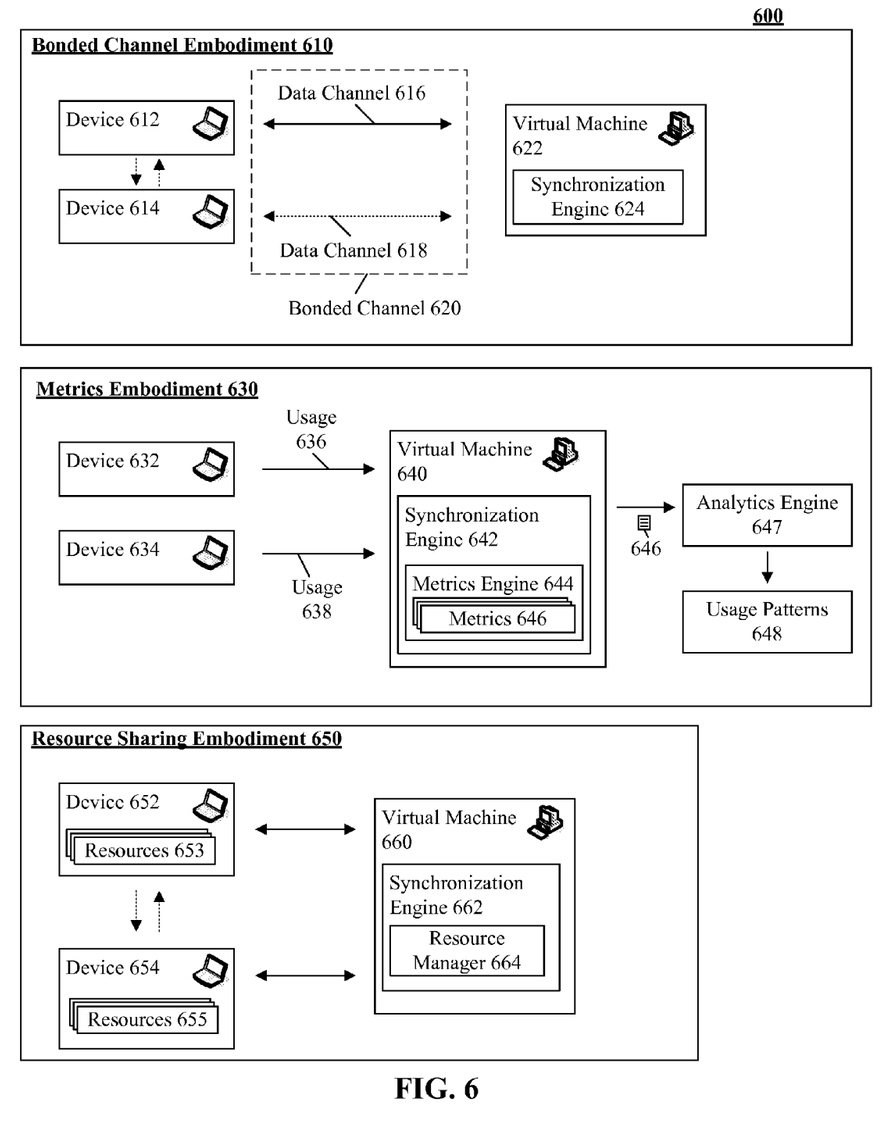
FIG. 6 is a schematic diagram illustrating a set of embodiments for user facing load balancing via virtual machine synchronization in accordance with an embodiment of the inventive arrangements disclosed herein.

FIG. 6 is a schematic diagram illustrating a set of embodiments 610, 630, 650 for user facing load balancing via virtual machine synchronization in accordance with an embodiment of the inventive arrangements disclosed herein. Embodiments 610, 630, 650 can be present in the context of scenarios 110, 130, 150, method 200, system 300, and/or embodiments 400, 500. In embodiment 610, a virtual machine 622 executing a synchronization engine 624 can permit data channel bonding between one or more devices 612, 614. In embodiment 630, usage 636, 638 associated with device 633, 634 can be collected by a synchronization engine 642 which can be utilized to determine usage patterns 648. In embodiment 650, a synchronization engine 662 can coordinate resource sharing between devices 652, 654. It should be appreciated that the functionality described herein can be orchestrated by a synchronization engine and/or virtual machines.

In bonded channel embodiment 610, data channel 616, 618 associated with device 612, 614 can be utilized in tandem to improve communication between device 612, 614 and virtual machine 622. For example, a mobile phone and a laptop can be communicatively linked to a virtual machine 622. The virtual machine 622 can execute a synchronization engine 624 which can perform one or more traditional and/or proprietary actions to bond data channel 616, 618. The bonded channel 620 can permit device 612 and/or device 614 to communicate with machine 622 utilizing both data channel 616, 618. It should be appreciated that data channels can include, but is not limited to, near field communication technologies (e.g., BLUETOOTH), wireless communication technologies, wired communication technologies, and the like. It should be appreciated that data channels can include multiple disparate channels (e.g., WiFi, telephony, 3G, 4G, WIMAX) and is not limited to two channels. That is, the disclosure can efficiently scale bandwidth based on available channels of proximate devices.

In metrics embodiment 630, usage 636, 638 information from device 632, 634 can be communicated to machine 640. In one instance, information 636, 638 can be conveyed as a step of a synchronization action associated with the disclosure. In one embodiment, engine 642 can include a metrics engine 644 able to extract metrics 646 from usage 636, 638 information. In the embodiment, metrics 646 can include, but is not limited to, selection information (e.g., clicks), interaction behavior (e.g., applications used, frequency), and the like. In one instance, metrics 646 be conveyed to an analytics engine 650 communicatively linked to engine 642 and/or engine 644. In the instance, analytics engine 650 can determine usage patterns 648. In one embodiment, usage patterns 648 can be utilized to perform targeted advertisement, enhance usability (e.g., recommendations), and the like.

In resource sharing embodiment 650, synchronization engine 662 executing within a virtual machine 660 can enable peer-to-peer resource sharing between device 652, 654. For example, engine 662 can permit two proximate devices to share memory resources. Resources 653, 655 can include, but is not limited to, hardware resources, software resources, and the like. In one instance, engine 662 can include a resource manager 644 able to determine resource 653, 655 availability. In the instance, available resources 653, 655 can be shared between device 652, 654. In one configuration, embodiment 650 can be enabled through the use of VM agents which can aid in the coordination of resource 653, 655 sharing.

The flowchart and block diagrams in the FIGS. 1-6 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for user facing load balancing comprising:
concurrently executing a native environment on a local device and a virtual environment on a server device linked to the native device over a network, wherein the concurrently executing shares state information to keep activities between the native environment and the virtual environment substantially time-synched, wherein the native environment is a user-machine interactive environment comprising a machine-to-user interactive interface, wherein the native environment is capable of stand-alone operation without appreciable end-user experience degradation;
detecting a process in the native environment requiring an estimated quantity of processing cycles to be consumed for completion that exceeds a previously established cycle threshold or requiring an estimated duration for completion that exceeds a previously established duration threshold;
responsive to detecting, the native environment not performing the processing using resources of the native environment; and
the virtual environment performing the process, and synchronizing the result of the process to the native environment, thereby permitting the native environment to continue to function as if the process was performed by the native environment.

2. The method of claim 1, wherein all processes performed by the local device in the native environment that do not exceed the previously established cycle threshold or the previously established duration threshold are executed locally in the native environment.

3. The method of claim 1, further comprising:
the virtual environment establishing service level agreement (SLA) constraints/conditions for handling processing that the native environment is not performing due to the previously established cycle threshold or duration threshold being exceeded;
the virtual environment determining whether SLA constraints/conditions are able to be met for the processes that the native environment is not handling using resources dedicated to the virtual machine; and
when the SLA constraints/conditions are not able to be met, the virtual machine utilizing additional server side resources to complete the processes within the constraints/conditions of the SLA, wherein the additional server side resources are external to those dedicated to the virtual machine.

4. The method of claim 1, wherein the detecting detects that the process in the native environment requires the estimated quantity of processing cycles that exceeds the previously established cycle threshold.

5. The method of claim 1, wherein the native environment is at least one of a GOOGLE NATIVE CLIENT (NaCl), a GOOGLE PEPPER, and a GOOGLE CHROME OS.

6. The method of claim 1, further comprising:
detecting a user interaction with a different native environment;
determining a cessation of user interaction with the native environment; and
conveying time information from the virtual environment to the different native environment resulting in the different native environment time-synched to the virtual environment.

7. The method of claim 1, further comprising:
performing a software change within the virtual environment and not performing the software change within the native environment; and
determining a conflict associated with the software change, wherein the conflict is at least one of a compatibility conflict, data format conflict and a resource conflict.

8. The method of claim 7, further comprising:
executing a change configuration management action to resolve the conflict.

9. The method of claim 1, wherein the detecting detects that the process in the native environment requires the estimated duration that exceeds the previously established duration threshold.

10. The method of claim 1, further comprising:
identifying a data retention policy associated with the native environment, wherein the policy specifies a data set associated with the native environment;
determining an identical data set within the virtual environment; and
conveying the identical data set to a repository in accordance with the data retention policy.

11. The method of claim 1, further comprising:
identifying a software license associated with a software executing within the virtual environment; and
providing legal access to the software to the local through the software license.

12. The method of claim 1, further comprising:
determining a data set associated with an exclusivity policy, wherein the exclusivity policy prevents the data set from being time-synched to the virtual environment.

13. The method of claim 1, further comprising:
detecting a device proximate to the local device executing the native environment, wherein the local device is associated with a network link, wherein the device is associated with a different network link; and
conveying state information to the virtual machine via the network link and the different network link concurrently.

14. The method of claim 1, further comprising:
collecting usage metrics from the virtual environment; and
analyzing the usage metrics to determine a usage behavior associated with a user of the native environment.

15. The method of claim 1, further comprising:
performing a targeted advertisement action within the native environment utilizing information obtained from the virtual environment.

16. The method of claim 1, further comprising:
creating a pool of resources including resources of the local device and including resources of a second device; and
the server device orchestrating resource management for resources of the pool.

17. A method for user facing load-balancing comprising:
concurrently executing two or more instances of a user session on two or more different computing devices, comprising at least a first device and a second device, said first device executing a first instance of the two or more instances, said second device executing a second instance of the two or more instances, said first device and said second device comprising hardware and software, wherein said first device and said second device are remotely located from each other and are communicatively linked to each other over a network, wherein at least the second device executing the second instances of the user session within a virtual machine running on the second device;
maintaining state across the instances of the user session in substantially real time, whereby state-affecting changes made in either the first instance or the second instances are communicated to other ones of the instances to maintain a synchronized state for the user session, wherein at least said first instance and said second instance of the user session are capable of independent handling of the user session;
detecting a process in the first instance requiring an estimated quantity of processing cycles to be consumed for completion that exceeds a previously established cycle threshold or requiring an estimated duration for completion that exceeds a previously established duration threshold;
responsive to detecting, the first instance not performing the process using resources of the first device; and
the second instance of the second device performing the process, and synchronizing the result of the process to the first instance of the first device, thereby permitting the first instance to continue to function as if the process was performed by the first instance.

18. The method of claim 17, further comprising:
detecting a failure associated with the first device, wherein the failure prevents the normal operation of the first device; and
responsive to detecting the failure, programmatically conveying state information associated with at least one of the first and second instances to a computing device remotely located from the first computing device and from the second computing device.

19. A system for user facing load-balancing comprising:
one or more processors executing programmatic instructions stored in one or more non-transitory storage mediums;
a synchronization engine, comprising at least a portion of the programmatic instructions, configured to persist a time-synchronized computing session associated with a native environment to a virtual environment, wherein the native environment and virtual environment execute concurrently, wherein the native environment executes in a first computing device and wherein the virtual environment executes in a second computing device connected to the first computing device by a network;
a data store able to persist at least one of a synchronization mapping, a state information, and a configuration setting;
at least a portion of the programmatic instructions to detect a process in the native environment requiring an estimated quantity of processing cycles to be consumed for completion that exceeds a previously established cycle threshold or requiring an estimated duration for completion that exceeds a previously established duration threshold;
at least a portion of the programmatic instructions to suppress performance of the process in the native environment responsive to detecting that estimated quantity of processing cycles exceeds the previously established cycle threshold or responsive to detecting that the estimated duration for completion exceeds that previously established duration threshold, wherein when performance of the process is suppressed, the process is not executed by a processor of the native environment; and
at least a portion of the programmatic instructions to perform the process within the virtual environment when performance of the process is suppressed in the native environment, and to synchronize the result of the process from the virtual environment to the native environment when performance of the process is suppressed in the native environment, thereby permitting the native environment of the first device to function as if the process was performed by the native environment.

20. The system of claim 19, wherein all processes performed by the local device in the native environment that do not exceed the previously established cycle threshold or the previously established duration threshold are executed locally in the native environment.

\* \* \* \* \*